United States Patent Office 3,664,727
Patented May 23, 1972

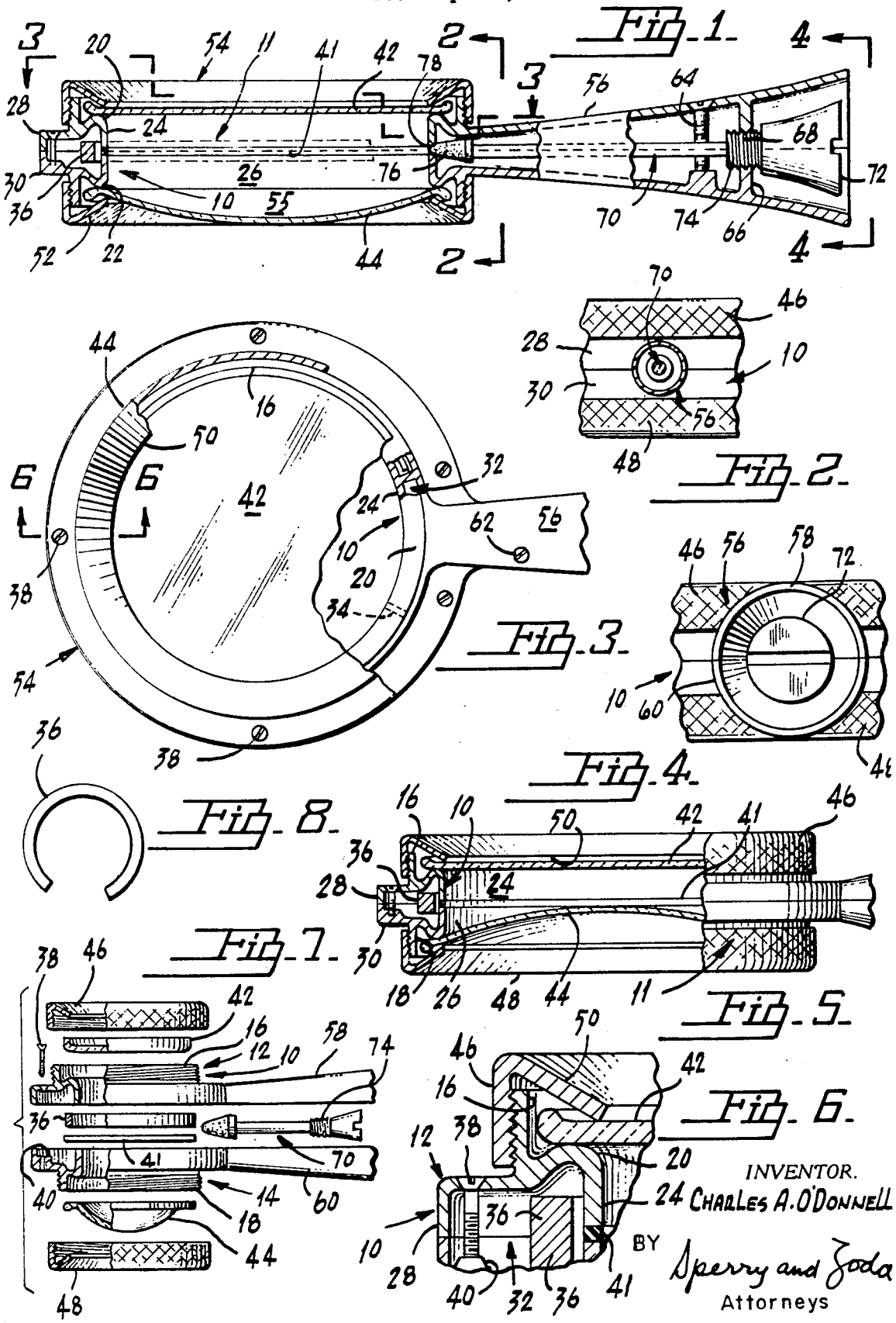

3,664,727
EDUCATIONAL LENS DEVICE FOR DEMONSTRATING OPTICAL PRINCIPLES
Charles A. O'Donnell, 308 Aquetong Road,
New Hope, Pa. 18938
Filed Sept. 9, 1970, Ser. No. 70,657
Int. Cl. G02b 3/12
U.S. Cl. 350—179      5 Claims

ABSTRACT OF THE DISCLOSURE

An optical viewing device, designed for magnifying or reducing the image of objects viewed therethrough, includes a hollow body lens that assumes at the user's option any of a variety of concave or convex lens configurations. Between the lenses is a space that can be charged with either a liquid or a gaseous light-transmitting medium. The device thus becomes usable to particular advantage as an educational aid for demonstrating the phenomenon of magnification and other basic optical principles, in that the user, having selected a lens configuration, may then optionally select a sequence of ambient light-transmitting media separated by the spaced lenses, for example liquid-air-liquid, or air-liquid-air.

BACKGROUND OF THE INVENTION (1) Field of the invention

The invention pertains to educational devices generally, and in a more particular sense to a device of this nature adapted particularly for demonstrating optical phenomena, especialy the magnification or reduction of the images of objects as viewed through a lens.

In another sense, the invention pertains to optical viewing devices, per se, especially those of the hand-held type used as ordinary magnifying glasses.

(2) Description of the prior art

The prior art as known to applicant includes the following United States Patents:

Name:
  Woodward _____ 60,109
  Black _____ 2,155,114
  Neumann _____ 2,297,240
  Flint _____ 2,300,251
  Jeffree _____ 2,450,965
  De Vasconcellos _____ 3,112,570

Heretofore, there has not been provided, to my knowledge, an educational device which will demonstrate optical principles governing the magnification and reduction of images, in a simple, swift and dramatic fashion. It is known to those skilled in optics that two essential conditions must obtain in order for the phenomena of magnification and reduction to occur. One of these conditions is that there must be a curved surface through which the light must pass in order to bend. The other condition is the alteration in the relative speed of light through a medium (that is, the index of refraction).

In order to demonstrate in a dramatic fashion the relationship between the two essential conditions specified, it is desirable that the optical viewing device used for demonstration purposes incorporate a particular capability for swift interchange not only of the lenses themselves (to allow the user to select concave and convex lens configurations), but also and very importantly, the device should permit swift interchange of the media incorporated within the device as the means for establishing the index of refraction. Thus, it is desirable that the device permit its being charged with any of a variety of liquid media; or alternatively, with a gaseous medium. And it is desirable that the device, when filled or charged with a selected one of said media, be capable of use either in ambient air or alternatively, in a liquid ambient (for example, under water).

The patents listed above show, in some instances, liquid-filled lenses. There is also teaching in the prior art for the interchange of lenses. However, the prior art is not believed to show or suggest an optical viewing device designed particularly for employment as an educational aid, in such fashion as to demonstrate forcefully and quickly, and as indicated above in a highly dramatic fashion, the optical phenomena described above along with the conditions needed to produce said phenomena.

SUMMARY OF THE INVENTION

Summarized briefly, the invention includes a hollow lens unit or body, which essentially comprises an annular frame to which first and second lens elements are independently, removably secured. By reason of this construction, the user can make a substitution for either lens element, thus providing at the option of the user a series of lens surfaces with varying radii in each of the basic concave or convex configurations.

The space between the lens elements can be filled either with a liquid medium or a gaseous medium, through a port opening through the wall of the frame into said space. A handle extending radially from the lens unit or body flares outwardly, in a direction away from said body, and is hollowly formed, the handle being in communication with the port so as to constitute a funnel-like receiver for a liquid medium, when the body is to be filled with a liquid for demonstrational purposes. Longitudinally shiftable within the handle is a stem, the inner end of which is fitted with a closure element adapted to normally close the port, tightly sealing the same against the loss of the medium.

BRIEF DESCRIPTION OF THE DRAWING

FIG. 1 s a longitudinal sectional view, a portion remaining in elevation, through an optical viewing device according to the present invention;

FIG. 2 is a transverse sectional view, portions being broken away, substantially on line 2—2 of FIG. 1;

FIG. 3 is a plan view, portions being broken away, substantially on line 3—3 of FIG. 1;

FIG. 4 is an end elevational view of the device as seen from line 4—4 of FIG. 1;

FIG. 5 is a view partly in side elevation and partly in section, showing one of the lens elements reversed to change the lens configuration from convex to concave;

FIG. 6 is an enlarged, fragmentary, detail sectional view substantially on line 6—6 of FIG. 3;

FIG. 7 is an exploded view on a reduced scale, in which the parts have been shown in some instances partly in side elevation and partly in section; and FIG. 8 is a plan view, on a reduced scale, of a ballast means for weighting the device when in use below the water surface.

DESCRIPTION OF THE PREFERRED EMBODIMENTS

Referring to the drawing in detail, 10 designates generally a supporting frame including an annular base 11 comprising mating, annular frame members 12, 14 respectively each of which is approximately Y-shaped in cross section (see FIG. 7) to include as the legs of the Y's, externally threaded, annular flanges 16, 18 respectively, integral or otherwise rigid with inwardly directed ledge portions 20, 22 respectively, that merge into inner side walls 24, 26 offset inwardly of the base from flanges 16, 18 by the ledge portions 20, 22. Also integral with the flanges are outwardly offset outer side walls 28, 30. When the frame members 12, 14 are abutted against each other in edge-contacting relation as in FIGS. 1 and 5, the inner and outer side walls, and the ledge portions, cooperate to define in the assembled supporting frame an annular cavity 32 having (see FIG. 3) transverse abutment walls 34, 34 limiting against rotation a horseshoe-shaped ballast or weight 36, shown per se in FIG. 8.

Frame members 12, 14 are secured tightly together by any suitable means, in the present instance angularly spaced screws 38 extending through mooth wall openings of frame member 12 into threaded engagement with correspondingly angularly spaced sockets 40 of frame member 14.

If desired, an annular gasket 41 can be provided, compressed tightly between the confronting edges of the inner side walls 24, 26 to prevent leakage into or out of the hollow interior of the device.

A planiform lens element 42 seats upon ledge portion 20 in spaced relation to a concavo-convex lens element 44 peripherally bearing against ledge portion 22. The lens elements are clamped sealably against the ledge portions by bezels 46, 48 respectively, threadedly engaged with flanges 16, 18 and formed with inwardly directed frusto-conical 50, 52 respectively the edges of which engage the respective lens elements.

It will be apparent that either lens element may be removed independently of the other, and interchanged with another lens element of different optical characteristics. As a result, a wide variety of lens shapes or configurations become possible. In the illustrated example shown in FIG. 1, a flat lens element 42 is in spaced relation to a concavo-convex element 44, the convex surface of which faces outwardly. By removing bezel 48, lens element 44 can be interchanged with other concavo-convex lens elements varying from one another in respect to their radii or other dimensions affecting their optical characteristics.

In any event, the device is thus seen to include a lens unit generally designated 54, comprised of the annular supporting frame 10, the lens elements, and the clamping benzels that attach the lens elements to the frame. The resulting lens unit is of hollow formation, having an interior 55 defined by the lens elements and the inner side wall of the base, and adapted to be filled with either a gaseous or a liquid medium.

The device constituting the present invention is further illustrated as including, in a preferred embodiment, a radial handle generally designated 56, flaring outwardly from the supporting frame 10 and rigid with the supporting frame. The handle 56, in fact, is in the illustrated example comprised of mating semi-cylindrical handle sections 58, 60 respectively, integral with the frame members 12, 14.

To hold the handle sections in assembled relation, screws 62, 64 can be spaced longitudinally of the handle sections, extending through smooth-wall openings of handle section 58 into threaded engagement with sockets provided in handle section 60.

In the assembled device, the hollow, flaring handle is provided adjacent its distal end, with a transverse partition 66, having a central, threaded opening 68. An elongated stem 70 extending axially of and within the handle 56, is provided at its outer end with an enlarged head having a screwdriver-bit-receiving kerf. Adjacent head 72 the stem is formed with a threaded collar 74 engaging in the opening 68.

At its inner end, the stem is provided with a closure element 76 which in the illustrated embodiment is tapered for sealing engagement in the orifice 78 formed in the side wall of the hollow lens unit 54.

USE OF THE INVENTION

As previously noted herein, one of the most difficult tasks for an educator is the demonstration of basic principles of science to students, particularly younger students, in terms that are simple and dramatic. This is true, for example, with respect to instructing students in basic optical principles governing the magnificant and reduction of images.

It is well known that the phenomenon of magnification, for example, occurs in the presence of and by reason of the relationship between two essential conditions: the curved surface through which the light must pass in order to bend, and the alteration in the relative speed of light through a medium (that is, the index of refraction).

In the invention, I permit, first of all, any of a series of lens surfaces of varying radii to be retained in the annular base to form a hollow lens. The hollow lens, which in the illustrated example has been designated as a lens unit 54, can thus be formed in any of the many well-known concave or convex lens configurations. By rotating a stem in a direction to shift the closure element away from the orifice 78, the hollow interior of lens unit 54 can be filled, with the tapered handle serving as a funnel-like inlet passage, with a liquid medium. The stem can then be rotated to return the closure element into sealing engagement with orifice 78.

In these circumstances, there is provided an ambient of air-liquid-air, that is, in the sence of the space between the viewer's eye and the object being viewed, the distance from the eye to the lens unit is occupied by air, the distance between the spaced lens elements of said unit is occupied by liquid, and the remaining distance from the lens unit to the viewed object is occupied by air.

If, for example, the device has been assembled with a concave lens (FIG. 5), the optical characteristic of the device in an air-liquid-air ambient is to magnify the viewed object.

The instructor may now quickly evacuate the liquid from the lens unit, by opening port 78. The closure element may then be returned to sealing engagement with orifice 78, to prevent leakage of liquid into the now evacuated lens unit. With the concave lens configuration of FIG. 5 retained, the instructor may now immerse the entire device in a liquid medium, to provide a sequence, from the viewer's eye to the viewed object, of liquid-air-liquid (liquid from the eye to the lens unit, air in the hollow interior 55, and liquid from the lens unit to the viewed object. The resultant effect of so reversing the ambient media is to cause a reversal in the optical characteristic of the lens, that is, though a concave lens in a gas-liquid-gas medium magnifies, it acts as a reducing lens in the liquid-gas-liquid medium.

It is this capability of the invention to demonstrate that the optical characteristic of a lens is dependent upon the surrounding medium, and not solely on the specific lens material, that is dramatically presented to the student.

Application of the lens would be primarily applied to educational facilities for classroom demonstrations of basic optical phenomena, using different liquid mediums, color tints, and the insertion of solid bodies within the hollow lens to observe the various visual effects. In addition, however, the lens device offers the student of the natural sciences the opportunity to magnify objects on land and under water. When filled first with water, it acts as a normal glass magnifier would to observe plant and insect life. When a stream or pond is the subject, the lens is merely reversed and evacuated to serve as a magnifier of underwater objects. The marine biologist, thus, has the advantage of a simple tool long used by the naturalist as part of his standard exploration equipment.

In combination or separately from the adaptability of the device for changing the combination of ambients occurring between the eye and the object, the device is adapted to demonstrate various other optical phenomena. To this end, as noted above it is constructed to retain any of a series of interchangeable lens elements of varying curvature and normally of uniform thickness, to provide a wide variety of lens shapes. The ballast or weight 36, in this connection, is incorporated as part of the assembly to compensate for the effects of buoyancy in a fluid medium, and obviously, any of various ballasts can be employed, either solid or of a fluid or granular nature.

I claim:

1. An optical viewing device comprising:
   (a) an annular supporting frame;
   (b) spaced first and second lens elements carried by said frame and cooperating to form a hollow lens unit; and
   (c) means providing access to the hollow interior of said unit, for selective admission, at the option of a user, of either a gaseous or a liquid medium between the lens elements, comprising a port in the frame opening upon the hollow interior of the lens unit, and a closure element movable between a port-closing seated position and an unseated position in which said element exposes the port to provide access to the hollow interior of the lens unit, said viewing device further including a hollow handle extending from the frame and a stem carrying said closure element and mounted within the handle for movement by a user toward and away from the lens unit, to shift the closure element between said seated and unseated positions thereof.

2. An optical viewing device as in claim 1 wherein the handle includes a partition having a threaded opening, said stem having a threaded portion engaged in said opening to effect said movement of the stem toward and away from the lens unit responsive to rotation of the stem by a user.

3. An optical viewing device comprising:
   (a) an annular supporting frame;
   (b) spaced first and second lens elements carried by said frame and cooperating to form a hollow lens unit;
   (c) means providing access to the hollow interior of said unit, for selective admission, at the option of a user, of either a gaseous or a liquid medium between the lens elements; and
   (d) means to substitute for each of said lenses independently of the other so as to form said lens unit in any one of a variety of lens shapes of differing characteristics as regards the magnification or reduction of a viewed object thereby, said frame including an annular base providing a side wall of said hollow lens unit, said lenses constituting remaining walls thereof and seating peripherally upon said base, said frame further including a pair of bezels removably connected to said base and cooperating therewith to clamp the respective lenses between the base and bezels, said base including outwardly facing ledges engaged by circumferential portions of the respective lenses, said base further including threaded circumferential flanges disposed radially outwardly from the ledges, the bezels being threaded for engagement with the respective flanges and being formed with radially inwardly extending lips bearing against said circumferential portions of the lenses, said access means comprising a port opening into the lens unit between the lenses, said device further including a hollow handle flaring outwardly from the lens unit in communication with said port to provide a funnel-like conduit for a liquid optical medium intended for disposition between the lenses, a stem mounted in the handle for adjustment by a user toward and away from the lens unit, and a closure element on the stem for closing and opening the port responsive to said adjustment of the stem toward and away from the lens unit.

4. An optical viewing device comprising:
   (a) an annular supporting frame;
   (b) spaced first and second lens elements carried by said frame and cooperating to form a hollow lens unit;
   (c) means providing access to the hollow interior of said unit, for selective admission, at the option of a user of either a gaseous or a liquid medium between the lens elements; and
   (d) means to substitute for each of said lenses independently of the other so as to form said lens unit in any one of a variety of lens shapes of differing characteristics as regards the magnification or reduction of a viewed object thereby, said frame including an annular base providing a side wall of said hollow lens unit, said lenses constituting remaining walls thereof and seating peripherally upon said base, said frame further including a pair of bezels removably connected to said base and cooperating therewith to clamp the respective lenses between the base and bezels, said base including outwardly facing ledges engaged by circumferential portions of the respective lenses, said base further including threaded circumferential flanges disposed radially outwardly from the ledges, the bezels being threaded for engagement with the respective flanges and being formed with radially inwardly extending lips bearing against said circumferential portions of the lenses, said base comprising separable, mating frame members forming an annular cavity in the base between said ledges, and weight means removably disposed within said cavity as a balast weighting the device to counteract the effect of buoyancy during use of the device below the water surface.

5. An optical viewing device comprising:
   (a) an annular supporting frame;
   (b) spaced first and second lens elements carried by said frame and cooperating to form a hollow lens unit;
   (c) means providing access to the hollow interior of said unit, for selective admission, at the option of a user, of either a gaseous or a liquid medium between the lens elements; and
   (d) means to substitute for each of said lenses independently of the other so as to form said lens unit in any one of a variety of lens shapes of differing characteristics as regards the magnification or reduction of a viewed object thereby, said access means comprising a port opening into the lens unit between the lenses, said device further including a hollow handle flaring outwardly from the lens unit in communication with said port to provide a funnel-like conduit for a liquid optical medium intended for disposition between the lenses, a stem mounted in the handle for adjustment by a user toward and away from the lens unit, and a closure element on the stem for closing and opening the port responsive to said adjustment of the stem toward and away from the lens unit.

References Cited

UNITED STATES PATENTS

| 2,300,251 | 10/1942 | Flint | 350—180 |
| 2,384,528 | 9/1945 | Brandt et al. | 350—256 X |

FOREIGN PATENTS

| 18,191 | 12/1892 | Great Britain | 350—179 |

JOHN K. CORBIN, Primary Examiner

U.S. Cl. X.R.

350—256